G. L. C. EARLE.
APPARATUS FOR RETURNING WATER OF CONDENSATION TO BOILERS, &c.
APPLICATION FILED MAY 19, 1916.
1,223,944.
Patented Apr. 24, 1917.
4 SHEETS—SHEET 1.
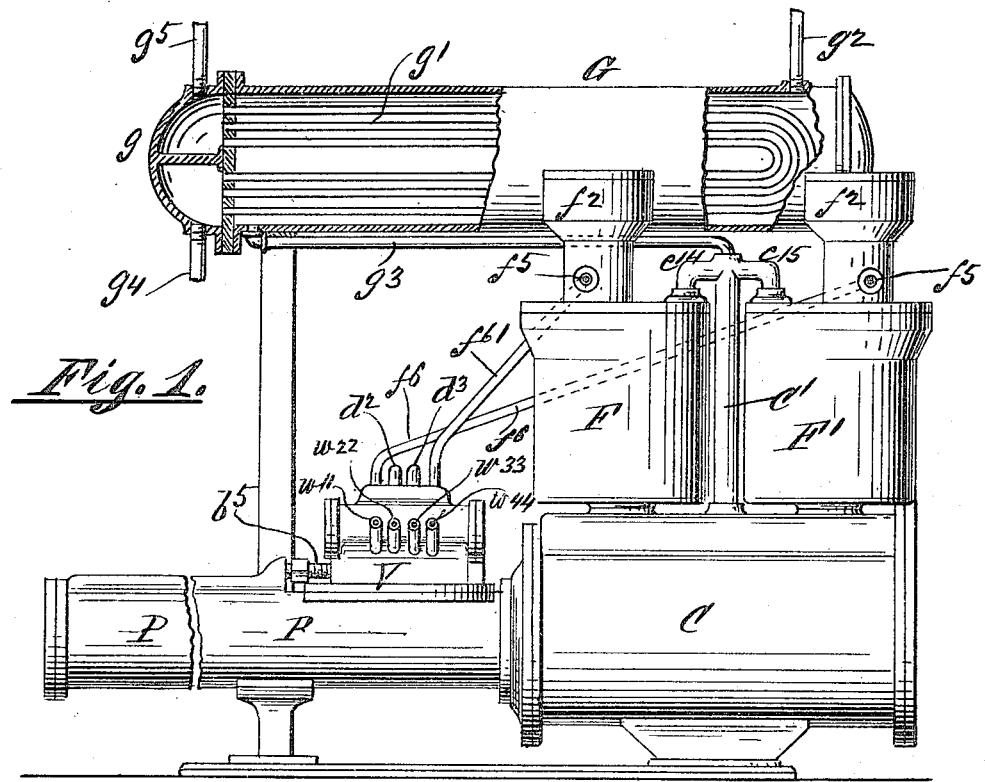
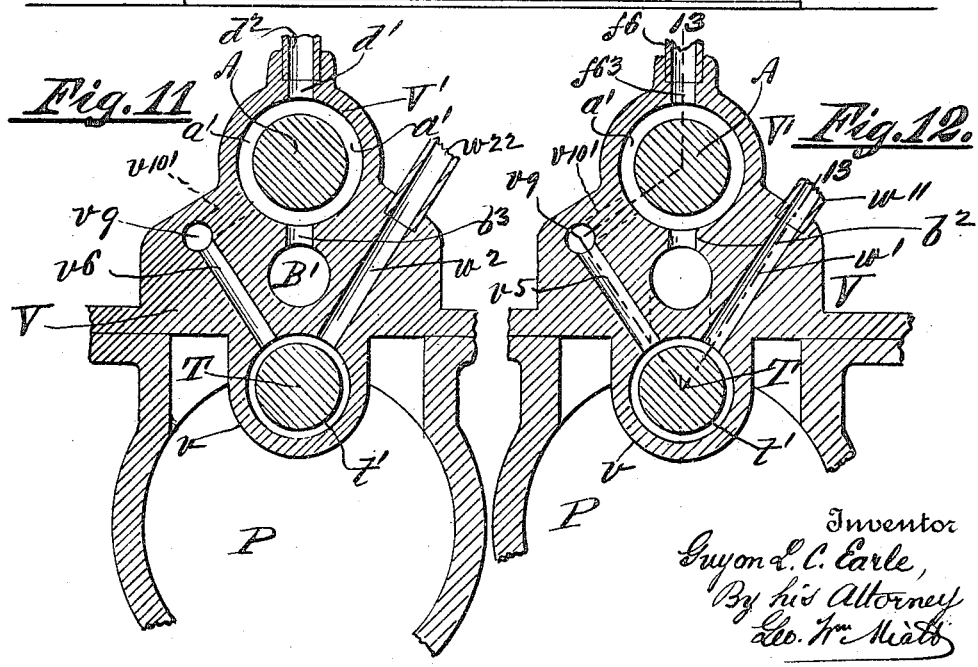

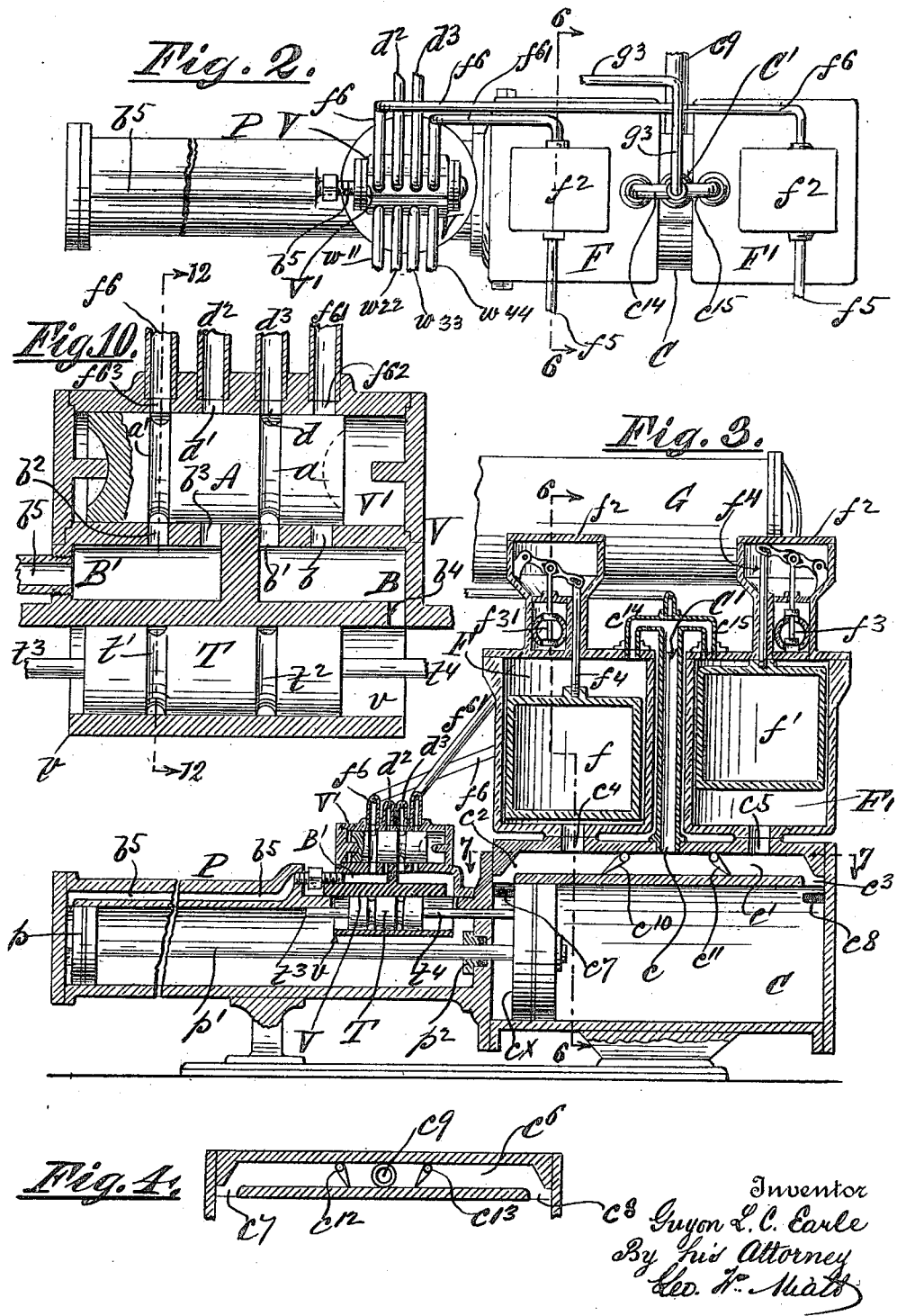

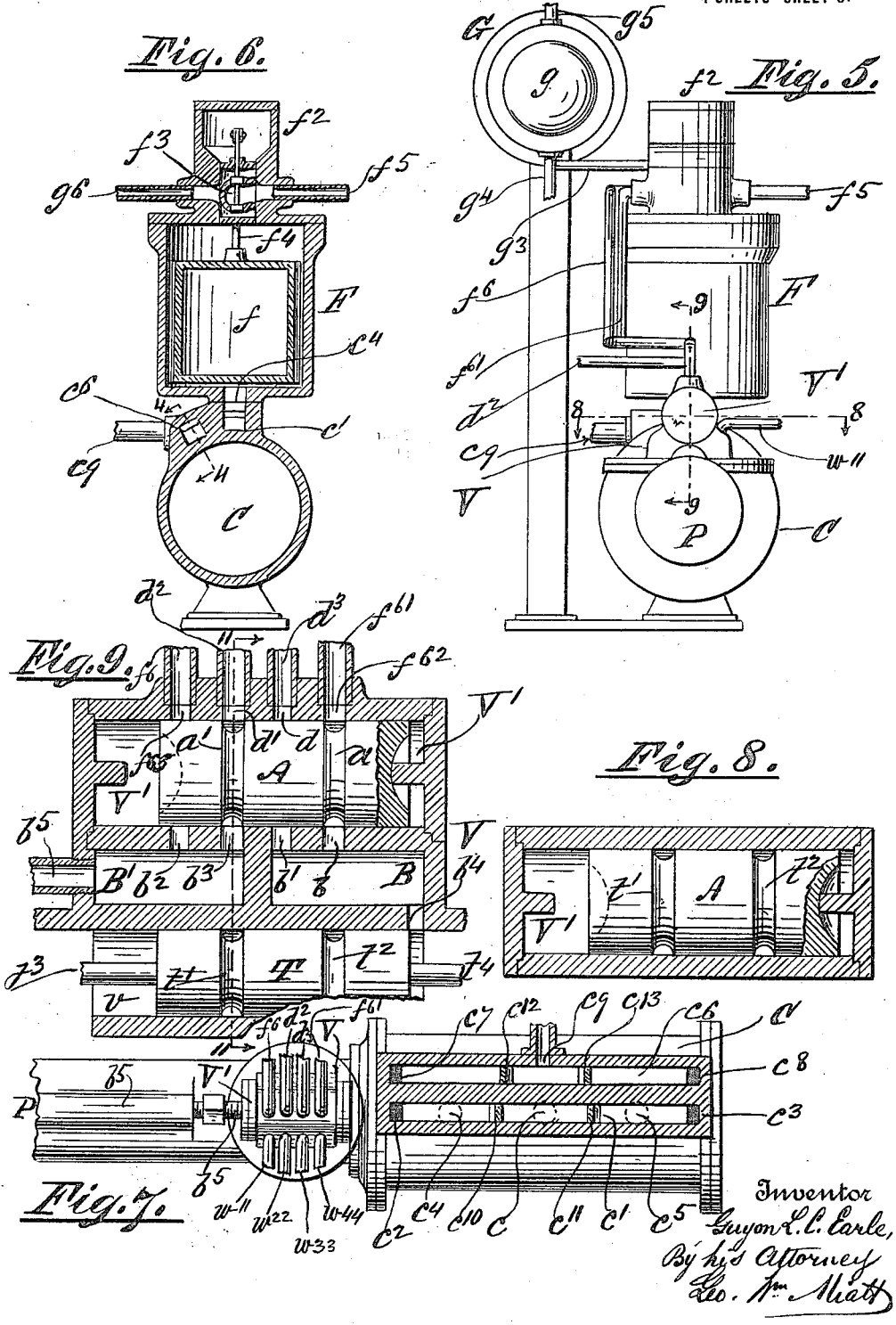

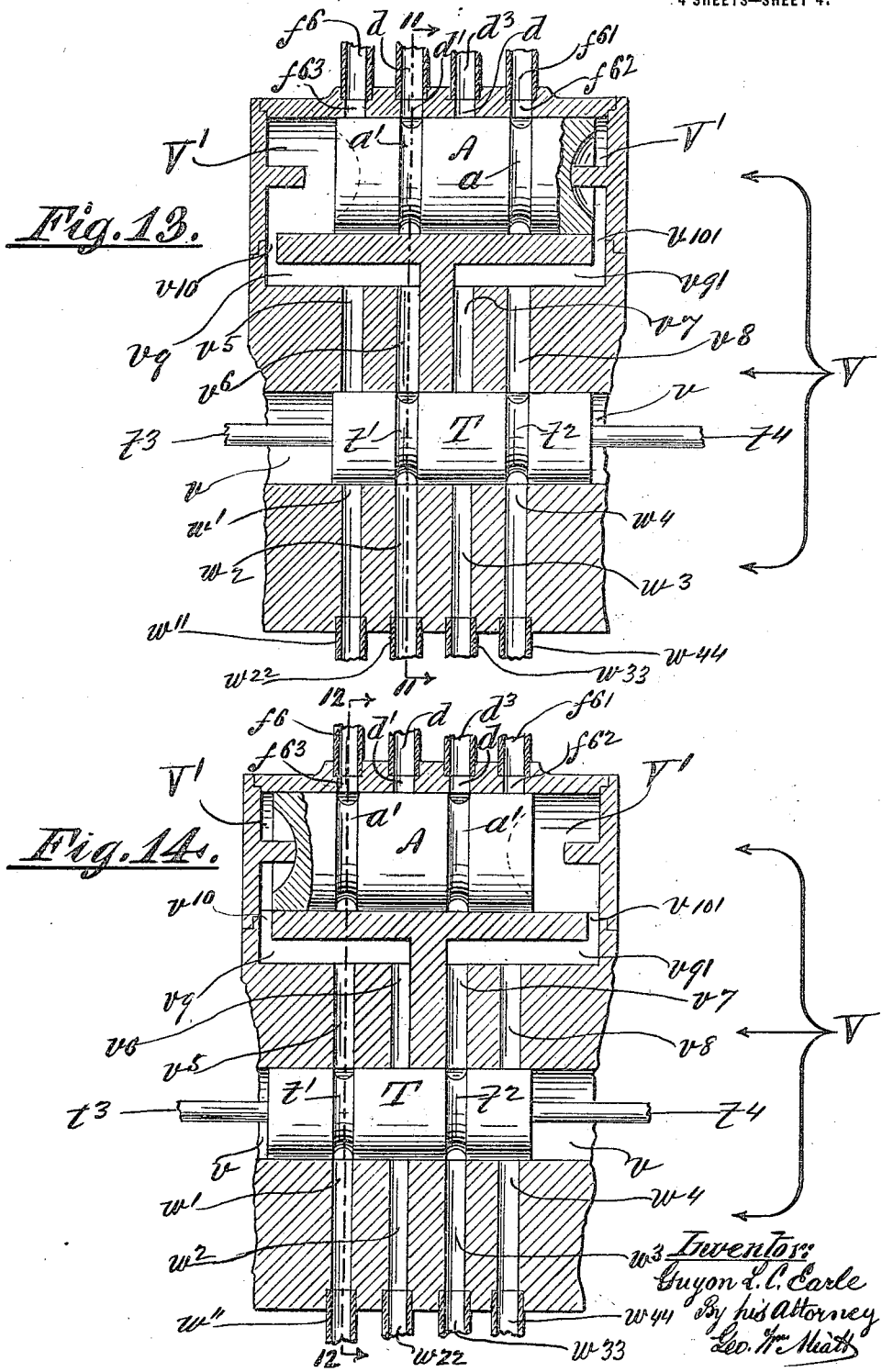

UNITED STATES PATENT OFFICE.

GUYON L. C. EARLE, OF FOREST HILLS, NEW YORK.

APPARATUS FOR RETURNING WATER OF CONDENSATION TO BOILERS, &c.

1,223,944. Specification of Letters Patent. Patented Apr. 24, 1917.

Application filed May 19, 1916. Serial No. 98,509.

*To all whom it may concern:*

Be it known that I, GUYON L. C. EARLE, a citizen of the United States, and a resident of Forest Hills, in the county of Queens and State of New York, have invented certain new and useful Improvements in Apparatus for Returning Water of Condensation to Boilers, &c., of which the following is a specification.

My invention relates primarily to the automatic and economic return of water of condensation to a steam boiler, as for instance in connection with a system of heating by steam, analogous to the manner set forth in my Letters Patent No. 1,121,339, and in my Patent No. 1,200,090, although in a broader sense the essential features of the present invention are applicable to the automatic collection and return or raising of various liquids in the arts by means of hydraulic pressure.

In the accompanying drawings,

Figure 1, is a sectional elevation of means embodying the essential features of my invention and illustrating the practical application thereof;

Fig. 2, is a top view of my automatic liquid collecting and delivery apparatus;

Fig. 3, is a central vertical longitudinal sectional elevation of the same;

Fig. 4, a sectional detail taken upon plane of line 4—4, Fig. 6;

Fig. 5, is an end elevation of the apparatus;

Fig. 6, a transverse section upon plane of line 6—6, Figs. 2 and 3;

Fig. 7, a horizontal section taken upon plane of line 7—7, Fig. 3;

Fig. 8, a sectional elevation upon a larger scale taken through the valve chest upon plane of line 8—8, Fig. 5;

Fig. 9, a sectional elevation taken through the valve chest upon plane of line 9—9, Fig. 5;

Fig. 10, a like view showing the cylindrical valves in the alternative positions;

Fig. 11, is a section taken upon line 11—11, Figs. 9 and 13;

Fig. 12, is a section taken upon plane of line 12—12, Figs. 10 and 14;

Fig. 13, is a sectional diagram taken on the four zigzag planes indicated by line 13—13, Fig. 12, as if spread out in a single plane, more clearly to illustrate the relationship of the ports and conduits;

Fig. 14, is a like view showing the cylindrical valves in reversed positions.

I herein show and describe my invention and apparatus as applied to the collection and return of water of condensation to a steam boiler or the like, it being understood that I do not confine myself to this use, since the apparatus and principle involved may be used for analogous purposes without departing from the spirit and intent of my invention in this respect.

The hot water generator G, may be of any desired or well known type, that shown in the drawings being provided with the partitioned water head $g$, with which the circulatory return bend pipes $g'$, (Fig. 1) communicate,—$g^2$, representing a steam inlet pipe to the generator cylinder G, and $g^3$, a drip pipe therefrom for the water of condensation. The cold water inlet pipe $g^4$, and the hot water outlet pipe $g^5$, communicate in the usual way with a hot water tank or reservoir, a circulatory heating system, or any other means or device for utilizing the heat imparted to the water by the generator G, and the boiler in conjunction with which it may be employed.

The water of condensation is conducted by the drip pipe $g^3$, to the collection and delivery cylinder C, through the medium of the stand pipe $C'$, which communicates at its lower extremity through a port $c$, (Fig. 3) with the central longitudinal passage $c'$, formed in the top of the cylinder shell, said passage $c'$ opening into the cylinder C, at opposite ends thereof through ports $c^2$, $c^3$. Two other ports $c^4$, $c^5$, open into the central longitudinal passage $c'$, one into each of the twin float chambers F, F'. Thus the port $c^4$, communicates with the float chamber F, while the port $c^5$, communicates with the float chamber F'; the positions of these ports $c^4$, and $c^5$, and of the inlet port $c$, from the stand pipe $C'$, being indicated in dotted lines in the horizontal section shown in Fig. 7.

By reference more particularly to the latter figure of the drawings it will be seen that the upper portion of the cylinder shell is also formed with another longitudinal passage $c^6$, parallel to the first named ($c'$) also opening through ports $c^7$, $c^8$, into the cylinder C, at opposite ends thereof. The central longitudinal passage $c'$, may be designated as the receiving passage, while the twin passage $c^6$, is essentially the discharge passage being provided with an exit port and pipe $c^9$, by which the water of condensation is returned to the boiler or other desired receptacle. For this reason the receiving channel $c'$, is provided with flap valves $c^{10}$, $c^{11}$, which open in opposite directions away from each other and away from the inlet port $c$, so as to prevent back pressure in the drip or stand pipe C′, while the discharge passage $c^6$, is correspondingly formed with flap valves $c^{12}$, and $c^{13}$, which however open only in the opposite direction to those in the receiving passage $c'$, or in other words toward each other and toward the final discharge port $c^9$, so as to check back pressure through said discharge port $c^9$. The relative positions of these flap valves are indicated in Fig. 7,—Fig. 3, showing the inclination of the valves $c^{10}$, and $c^{11}$, in the receiving passage $c'$, and Fig. 4, showing the inclination of the valves $c^{12}$ and $c^{13}$, in the discharge passage $c^6$.

The drip stand pipe C′, is formed with branches $c^{14}$, $c^{15}$, which communicate respectively with the upper portions of the float chambers F, F′, so as to equalize the pressure therein and allow the floats $f$, $f'$, to rise and fall freely under control of the water of condensation as hereinafter more fully set forth. Each float chamber F, F′, is provided with a valve casing $f^2$, in which a balance valve $f^3$, (shown symbolically) of any desired or well known construction is mounted, the valve stem being actuated and controlled in a manner well known by a float rod $f^4$, with which each float $f$, $f'$, is provided (see Fig. 3). The balance valves $f^3$, are interposed between hydraulic pressure inlet pipes $f^5$, $f^5$, and pipes $f^6$, $f^{61}$, by which the pressure is conveyed on occasion to the valve chest V, mounted upon the power cylinder P.

The power cylinder P, is in axial alinement with the receiving and delivery cylinder C, and the power piston $p$, and the delivery piston $c^x$, are rigidly connected by means of the piston rod $p'$, which extends through a packing $p^2$, in the head $p^3$, between the cylinders C, P,—see Fig. 3.

V, is a valve chest or casing mounted on top of the power cylinder P, and formed with a pendent sleeve $v$, which extends down into the latter. This sleeve $v$, has a cylindrical interior runway which is parallel axially with the axes of the cylinders P, and C, and with the piston rod $p'$, and in it rests and fits snugly but loosely a switch valve cylinder T, formed with annular peripheral port grooves $t'$, $t^2$, and with axial arms or extensions $t^3$, $t^4$, which are of such length that the power piston $p$, and the delivery piston $c^x$, alternately contact therewith sufficiently to push the switch valve cylinder T, back and forth in its sleeve $v$, to bring its peripheral port grooves $t'$, $t^2$, alternately into coincidence with either the ports $v'$, $v^7$, (see Fig. 14) or the ports $v^6$, $v^8$, (see Fig. 13) according to the direction of reciprocal thrust of the pistons.

When the peripheral port groove $t'$, of the switch valve cylinder T, is in coincidence with port $v^5$, it is also in coincidence with port $w'$, communicating with the discharge $w''$, while at the same time port $t^2$, opens communication between port $v^7$, and port $w^3$, connected with the power pipe $w^{33}$, (Fig. 14). In like manner when the port groove $t'$, of the switch valve cylinder is in coincidence with the port $v^6$, it is also in coincidence with port $w^2$, (Fig. 13) connected with the power pipe $w^{22}$, while at the same time port $t^2$, opens communication between port $v^8$, and port $w^4$, connected with the discharge pipe $w^{44}$. The pipes $w^{22}$, $w^{33}$, communicate with a suitable source of hydraulic pressure, while the pipes $w''$, $w^{44}$, convey off the discharge in a suitable manner.

The function of the switch valve cylinder T, is to shift the actuating hydraulic power from one end of the power cylinder P, to the other and to provide for its discharge alternately from opposite ends of said power cylinder, and this it accomplishes by effecting the reciprocation of the main cylindrical valve A, situated in the valve chamber V′, in the upper part of the valve chest V,— through the medium of the port passages $v^5$, $v^6$, $v^7$, $v^8$, interposed between the cylindrical sleeve $v$, and the longitudinal passages $v^9$, $v^{91}$, having ports $v^{10}$, $v^{101}$, opening into the valve chamber V′, at either end thereof,— the annular port grooves $t'$, $t^2$, of the switch valve cylinder T, communicating alternately with the passages $v^5$, and $v^7$, and with port passages $v^6$, and $v^8$, as will be understood by reference to Figs. 13, and 14,—said main cylindrical valve A, being formed with annular ports $a$, $a'$. Of these annular ports $a$, is adapted to communicate alternately with ports $f^{62}$, and $b$, and $d^3$, and $b'$, (see Figs. 9 and 10) while $a'$, is adapted to communicate alternately with ports $f^{63}$, $b^2$, or $d'$, and $b^3$. The inlet ports $f^{62}$, and $f^{63}$, communicate respectively with the pipes $f^6$, $f^{61}$, through which and the balance valves $f^3$, $f^{31}$, in the float valve casings $f^2$, the hydraulic power is supplied to reciprocate the piston $p$, in the power cylinder P, while the exit ports $d$, $d'$, communicate with discharge pipes $d^2$, $d^3$. $b$, is an inlet port into the chamber B, and $b'$, an exit port therefrom, while $b^2$, is an inlet port into the chamber B′, and $b^3$, an exit port therefrom, as will be understood by reference to Figs. 9 and 10. The chamber B, communicates through the passage $b^4$, with the inner end of the power cylinder P, while the chamber B', communicates with the other extremity of said cylinder through conduit $b^5$, as shown in Fig. 3.

Having thus illustrated and described various parts, ports and passages adapted to the practical application of my invention, although not wishing to confine myself in this respect to the identical construction and arrangement of parts herein shown, I will now set forth the functions thereof, describing a complete cycle of operation from the position of parts indicated in Fig. 3, in which the retractile stroke of the power piston $p$, has caused the delivery piston $c^x$, to contact with the arm $t^4$, of the switch valve cylinder T, to shift the latter so as to bring its port $t'$, into coincidence with the port $v^5$, (Fig. 14) to the passage $v^9$, and also into coincidence with the discharge port $w'$, while its port $t^2$, coincides with the port $v^7$, to the passage $v^{91}$, and with port $w^3$, to the discharge $w^{33}$.

As a result of this positioning of the switch valve cylinder T, and with the other parts in the relative positions shown in said Fig. 3, the water of condensation from the drip pipe $g^3$, passes through the stand pipe C', port $c$, passage $c'$, and port $c^3$, into the collection cylinder C, and when this fills it overflows into the float chamber F', finally raising the float $f'$, and thereby opening the balance valve $f^3$, and admitting hydraulic pressure therethrough to the pipe $f^6$, and port $f^{63}$, (Fig. 9) and thence through annular passage $a'$, of the main valve cylinder A, to the port $b^2$, and chamber B', and from there through the conduit $b^5$, into the outer end of the power cylinder P, thereby forcing the power piston $p$, to the inner or right hand end of the power cylinder P, and causing the delivery piston $c^x$, to eject the water of condensation at the right thereof from the collection cylinder C, out through port $c^8$, and passage $c^6$, to the discharge pipe $c^9$, by which the water of condensation is returned to the boiler or otherwise disposed of as desired. During this discharge through the port $c^8$, the flap valve $c^{11}$, closes automatically, cutting off communication between said port $c^8$, and the stand pipe C'. In the mean time the water of condensation previously collected in the float chamber F, has passed down through the port $c^4$, passage $c'$, and port $c^2$, to the collection cylinder C, at the rear or left of the delivery piston $c^x$, as the latter has advanced in effecting the ejection of the water of condensation through the port $c^8$, as just set forth, and the drip entering through the stand pipe C', is also free to follow the same course through the passage $c'$, and port $c^2$,—the flap valve $c^{10}$, opening automatically for the purpose.

The descent of the float $f$, in the chamber F, of course closes the balance valve $f^{31}$, controlled by it.

At the completion of this stroke of the pistons $p$, and $c^x$, from left to right the power piston $p$, contacts with the extension $t^3$, of the switch valve cylinder T, shifting the latter to the position shown in Figs. 9, and 13, when hydraulic pressure will enter through pipe $w^{22}$, and port $w^2$, to and through the annular passage $t'$, in the switch valve cylinder T, to and through the port $v^6$, to the passage $v^9$, and thence to the left end of the valve chamber V', thereby forcing the main valve cylinder A, to the right and effecting the displacement of the water from the right end of the valve chamber V', through the port $v^{101}$, passage $v^{91}$, port $v^8$, annular passage $t^2$, port $w^4$, to the discharge pipe $w^{44}$. Also this shifting of the main valve cylinder A, cuts off the hydraulic pressure from the power cylinder P, and also the discharge through $b^4$, B, $b'$, $a$, and $d^3$, Fig. 9, so that the pistons $p$, $c^x$, remain stationary at the end of the stroke from right to left for the time being, it being remembered that the port $f^{62}$, is inoperative under these conditions because the descent of the float $f$, has closed the valve $f^{31}$, which it controls.

Under the conditions just set forth the water of condensation will collect in the cylinder C, at the rear or left side of the delivery piston $c$, until it overflows into the valve chamber F, and raises the float $f$, thereby opening the balance valve $f^{31}$, and admitting hydraulic pressure through the pipe $f^{61}$, and port $f^{62}$, to the annular passage $a$, (see Fig. 9) in the main valve cylinder A, and thence through the port $b$, chamber B, and port $b^4$, to the right hand side of the power piston $p$, pushing the latter back again to the position first named, as in Fig. 3,—the discharge from in front or left hand side of the power piston $p$, taking place through the passage $b^5$, chamber B', port $b^3$, passage $a'$, port $d'$, and discharge pipe $d^2$. At the completion of this retractile stroke of the pistons $p$, and $c^x$, the latter again contacts with extension $t^4$, of the switch valve cylinder T, again shifting it into the position shown in Figs. 3, 10, and 14, when the cycle of operation will be repeated as the water of condensation collects in sufficient quantity.

It will thus be seen that the whole operation of my apparatus is rendered automatic and continuous as long as water of condensation or other liquid is fed to the collection cylinder C. In attaining this result the cylindrical valve cylinders T, and A, perform an important function in that their action is rendered positive without resort to mechanical expedients or devices if we except the extensions $t^3$, $t^4$, of the switch valve cylinder with which the pistons $p$, $c^x$, contact alternately at the termination of their reciprocatory movements. Dead centers are thus avoided, and frictional resistance eliminated to a great extent, and the whole apparatus materially simplified in construction and operation. In this connection the perfect balance attained for the delivery cylinder C, is to be noted.

In fact the present invention is the result of experimental investigation in connection with the apparatus shown and described in my Letters Patent and the concurrent application hereinbefore referred to, the object being to eliminate mechanical expedients and devices as far as possible, thereby reducing initial expense and frictional resistance in operation to a minimum, at the same time attaining a more compact apparatus in which there are absolutely no external working parts to be exposed to injury from contact with extraneous objects, or subject to contamination by dirt, or capable of being tampered with,—thus rendering the apparatus essentially self-contained, self-controlled, and fool proof.

What I claim as my invention and desire to secure by Letters Patent is,

1. In hydraulic apparatus of the character designated the combination of a low pressure liquid collection cylinder, a high pressure liquid cylinder in alinement therewith, pistons in said cylinders united by a common piston rod, inlets for admitting liquid to both sides of the piston in said collection cylinder, outlets therefor on both sides of said piston, an actuating liquid supply independent of both the inlets and outlets of the actuated liquid, inlet valves controlling the said pressure cylinder, outlet valves controlling the discharge of liquid pressure from said pressure cylinder, means for reversing said inlet and outlet valves, float valves controlling the supply of fluid pressure to said inlet valves and actuated by the liquid collected in said collection cylinder, said parts being positive in their action and operable under varying conditions, for the purpose set forth.

2. In hydraulic apparatus of the character designated, the combination of a liquid high pressure actuating cylinder and a low pressure liquid collection cylinder in axial alinement therewith, pistons in said cylinders connected to act in unison, float chambers communicating with the said low pressure collection cylinder, floats therein and liquid high pressure valves controlled by said floats whereby the power is shifted alternately to opposite ends of the actuating cylinder, for the purpose set forth.

3. In hydraulic apparatus of the character designated, the combination of a liquid high pressure actuating cylinder and a low pressure liquid collection cylinder in axial alinement therewith, pistons in said cylinders connected to act in unison, float chambers communicating with said low pressure liquid collection cylinder, a drip pipe communicating with said low pressure liquid collection cylinder and with said float chambers, floats in the latter and liquid high pressure valves controlled by said floats, whereby the liquid power pressure is shifted alternately to opposite ends of the actuating cylinder, for the purpose described.

4. In hydraulic apparatus of the character designated, the combination of a liquid high pressure actuating cylinder and a low pressure liquid collection cylinder in axial alinement therewith, pistons in said cylinders connected to act in unison, a liquid inlet passage with ports opening into the collection cylinder at opposite ends thereof, discharge ports at opposite ends of said liquid collection cylinder, float chambers communicating with said inlet passage to the collection cylinder, floats therein and liquid high pressure valves controlled by said floats whereby the high pressure liquid power is shifted alternately to opposite ends of the actuating cylinder, for the purpose described.

5. In hydraulic apparatus of the character designated, the combination of a liquid high pressure actuating cylinder and a low pressure liquid collection cylinder in axial alinement therewith, pistons in said cylinders connected to act in unison, a liquid inlet passage with ports opening into the liquid collection cylinder at opposite ends thereof, discharge ports at opposite ends of said liquid collection cylinder, a drip stand pipe communicating with said inlet passage, float chambers communicating with said inlet passage and with said drip stand pipe, floats therein, and liquid high pressure valves controlled by said floats whereby high pressure liquid power is applied alternately to opposite ends of the actuating cylinder, for the purpose described.

6. In hydraulic apparatus of the character designated, the combination of a liquid high pressure actuating cylinder and a low pressure liquid collection cylinder in axial alinement therewith, pistons in said cylinders connected to act in unison, a liquid inlet passage with ports opening into the collection cylinder at opposite ends thereof, a liquid discharge passage having ports opening into the collection cylinder at opposite ends thereof, a check valve interposed between each of said discharge ports and a common discharge outlet, a drip stand pipe opening into said inlet passage, check valves in the latter, one interposed between each of said cylinder inlet ports and said drip stand pipe, float chambers communicating with said inlet passage and with said drip stand pipe, floats therein, and liquid high pressure valves controlled by said floats, whereby high pressure liquid power is applied alternately to the opposite ends of the actuating cylinder, for the purpose described.

7. In hydraulic apparatus of the character designated, the combination of a liquid high pressure actuating cylinder and a low pressure cylinder for the collection of water of condensation in axial alinement therewith, pistons in said cylinders connected to act in unison, a switch valve mounted in a sleeve protruding into the actuating cylinder and adapted to be shifted alternately by the power piston and the delivery piston, port passages in said switch valve adapted to communicate alternately with hydraulic power inlet and discharge ports and with corresponding ports communicating with opposite ends of a main valve chamber, and said main valve formed with port passages adapted to communicate alternately with power inlet and discharge ports, and with ports for the inlet and discharge of power from both ends of the actuating cylinder, whereby the reciprocation of the pistons is utilized to shift the power from one end of the actuating cylinder to the other, for the purpose described.

8. In hydraulic apparatus of the character designated, the combination of a liquid high pressure actuating cylinder and a low pressure liquid collection cylinder in axial alinement therewith, pistons in said cylinders connected to act in unison, a switch valve mounted in a sleeve protruding into the actuating cylinder and adapted to be shifted alternately by the power piston and the delivery piston, port passages in said switch valve adapted to communicate alternately with hydraulic power inlet and discharge ports and with corresponding ports communicating with opposite ends of a main valve chamber, and said main valve formed with peripheral port passages adapted to communicate alternately with power inlet and discharge ports, and with ports for the inlet and discharge of power from both ends of the actuating cylinder, whereby the reciprocation of the pistons is utilized to shift the power from one end of the actuating cylinder to the other, float chambers communicating with said low pressure collecting cylinder, floats therein, and high pressure valves controlled by said floats and communicating with the said high pressure cylindrical main valve chamber, for the purpose described.

9. In hydraulic apparatus of the character designated, the combination of a liquid high pressure actuating cylinder and a low pressure liquid collection cylinder in axial alinement therewith, pistons in said cylinders connected to act in unison, a switch valve mounted in a sleeve protruding into the actuating cylinder and adapted to be shifted alternately by the power piston and the delivery piston, port passages in said switch valve adapted to communicate alternately with hydraulic power inlet and discharge ports and with corresponding ports communicating with opposite ends of a main valve chamber, and said main valve formed with peripheral port passages adapted to communicate alternately with power inlet and discharge ports, and with ports for the inlet and discharge of power from both ends of the actuating cylinder, whereby the reciprocation of the pistons is utilized to shift the power from one end of the actuating cylinder to the other, float chambers communicating with said low pressure liquid collecting cylinder, a drip stand pipe communicating with said low pressure liquid collection cylinder and with said float chambers, floats in the latter, and liquid high pressure valves controlled by said floats and communicating with said high pressure cylindrical main valve chamber, for the purpose described.

10. In hydraulic apparatus of the character designated, the combination of a liquid high pressure actuating cylinder and a low pressure liquid collection cylinder in axial alinement therewith, pistons in said cylinders connected to act in unison, a switch valve mounted in a sleeve protruding into the actuating cylinder and adapted to be shifted alternately by the power piston and the delivery piston, port passages in said switch valve adapted to communicate alternately with hydraulic power inlet and discharge ports and with corresponding ports communicating with opposite ends of a main valve chamber, and said main valve formed with port passages adapted to communicate alternately with power inlet and discharge ports, and with ports for the inlet and discharge of power from both ends of the actuating cylinder, whereby the reciprocation of the pistons is utilized to shift the power from one end of the actuating cylinder to the other, an inlet passage with ports opening into the collection cylinder at opposite ends thereof, discharge ports at opposite ends of said collection cylinder, float chambers communicating with said inlet passage to the collection cylinder, floats therein, and high pressure valves controlled by said floats and communicating with said liquid high pressure main cylindrical valve chamber, for the purpose described.

11. In hydraulic apparatus of the character designated, the combination of a liquid high pressure actuating cylinder and a low pressure liquid collection cylinder in axial alinement therewith, pistons in said cylinders connected to act in unison, a switch valve mounted in a sleeve protruding into the actuating cylinder and adapted to be shifted alternately by the power piston and the delivery piston, port passages in said switch valve adapted to communicate alternately with hydraulic power inlet and discharge ports and with corresponding ports communicating with opposite ends of a main valve chamber, and said main valve formed with port passages adapted to communicate alternately with power inlet and discharge ports, and with ports for the inlet and discharge of power from both ends of the actuating cylinder, whereby the reciprocation of the pistons is utilized to shift the power from one end of the actuating cylinder to the other, an inlet passage with ports opening into the collection cylinder at opposite ends thereof, discharge ports at opposite ends of said collection cylinder, a drip stand pipe communicating with said inlet passage, float chambers communicating with said inlet passage and with said drip stand pipe, floats therein, and liquid high pressure valves controlled by said floats and communicating with the said high pressure cylindrical main valve chamber, for the purpose set forth.

12. In hydraulic apparatus of the character designated, the combination of a liquid high pressure actuating cylinder and a low pressure liquid collection cylinder in axial alinement therewith, pistons in said cylinders connected to act in unison, a switch valve mounted in a sleeve protruding into the actuating cylinder and adapted to be shifted alternately by the power piston and the delivery piston, port passages in said switch valve adapted to communicate alternately with hydraulic power inlet and discharge ports and with corresponding ports communicating with opposite ends of a main valve chamber, and said main valve formed with port passages adapted to communicate alternately with power inlet and discharge ports, and with ports for the inlet and discharge of power from both ends of the actuating cylinder, whereby the reciprocation of the pistons is utilized to shift the power from one end of the actuating cylinder to the other, an inlet passage with ports opening into the collection cylinder at opposite ends thereof, a discharge passage having ports opening into the collection cylinder at opposite ends thereof, a check valve interposed between each of said discharge ports and a common discharge outlet, a drip stand pipe opening into said inlet passage to the collection cylinder, check valves in said inlet passage interposed between each of said cylinder inlet ports and said drip stand pipe, float chambers communicating with said inlet passage and with said drip stand pipe, floats therein, and liquid high pressure valves controlled by said floats and communicating with the said high pressure cylindrical main valve chamber, for the purpose described.

13. In hydraulic apparatus of the character designated, the combination with the high liquid pressure actuating cylinder and liquid condensation cylinder arranged in axial alinement and with the power and delivery pistons connected to reciprocate in unison, of means for controlling the transfer of hydraulic power pressure from one end of the actuating cylinder to the other, consisting of a switch valve slidably supported in the actuating cylinder and adapted to be shifted longitudinally and alternately by the power piston and the delivery piston, said switch valve being formed to control the inlet and outlet ports to a main power valve chamber whereby said main power valve may be shifted, together with said main power valve formed with port passages controlling the inlet and outlet of hydraulic pressure to and from both ends of the actuating cylinder, for the purpose described.

14. Hydraulic apparatus of the character designated, comprising a high pressure liquid actuating cylinder and a low pressure liquid of condensation collection cylinder in alinement, pistons in said cylinders connected to reciprocate in unison, float and valve mechanism arranged to control the supply of liquid power to the actuating cylinder valve mechanism, said actuating cylinder valve mechanism arranged to shift the power from one end of the actuating cylinder to the other, and a switch valve in the actuating cylinder arranged to be shifted by the reciprocation of the pistons, all of the operative parts being isolated and inclosed by the casing, for the purpose described.

15. In hydraulic apparatus of the character designated, the combination of a high liquid pressure actuating cylinder and a low pressure liquid of condensation collection cylinder pistons in said cylinders connected to act in unison, float mechanism actuated by the water of condensation whereby the hydraulic power is shifted alternately to opposite ends of the actuating cylinder.

16. In hydraulic apparatus of the character designated, the combination with the high liquid pressure actuating chamber, and a low pressure liquid of condensation collecting cylinder arranged in axial alinement and with the power and delivery pistons connected to reciprocate in unison, of means for controlling the transfer of hydraulic power pressure from one end of the actuating cylinder to the other, consisting of a switch valve slidably supported in the actuating cylinder and adapted to be shifted longitudinally and alternately by the power piston and the delivery piston, said switch valve being formed to control the inlet and outlet ports to a main power valve chamber whereby said main power valve may be shifted, together with said main power valve formed with port passages controlling the inlet and outlet of hydraulic pressure to and from both ends of the actuating cylinder, for the purpose described.

17. In hydraulic apparatus of the character designated, the combination of a low pressure liquid collection cylinder, a high pressure liquid cylinder in alinement therewith, pistons in said cylinders united by a common piston rod, an inlet for admitting liquid to said collection cylinder and an outlet therefor, an actuating liquid supply independent of said inlet and outlet of the actuated liquid, an inlet valve controlling the said pressure cylinder, an outlet valve controlling the discharge of liquid pressure from said pressure cylinder, means for reversing said inlet and outlet valves, and a float valve controlling the supply of liquid pressure to said inlet valve and actuated by the liquid collected in said collection cylinder, said parts being positive in their action and operable under variable conditions, for the purpose set forth.

GUYON L. C. EARLE.

Witnesses:
Geo. Wm. Miatt,
Dorothy Miatt.

Copies of this patent may be obtained for five cents each, by addressing the "Commissioner of Patents. Washington, D. C."